United States Patent [19]

Reno

[11] Patent Number: 4,827,130
[45] Date of Patent: May 2, 1989

[54] SELECTABLE FIELD INFRARED IMAGER AND LENS SET

[75] Inventor: Charles W. Reno, Cherry Hill, N.J.

[73] Assignee: General Electric Company, Moorestown, N.J.

[21] Appl. No.: 111,832

[22] Filed: Oct. 22, 1987

[51] Int. Cl.$^4$ .................................................. G01J 1/42
[52] U.S. Cl. .................................... 250/332; 250/352; 250/353; 350/1.3
[58] Field of Search ............... 250/332, 330, 352, 353; 350/1.3

[56] References Cited

U.S. PATENT DOCUMENTS

| | | | |
|---|---|---|---|
| 4,041,314 | 8/1977 | Oppelt | 250/352 |
| 4,421,985 | 12/1983 | Billingsley et al. | 250/353 |
| 4,427,259 | 1/1984 | Fieldsted | 350/1.3 |
| 4,431,917 | 2/1984 | Gibbons | 250/352 |
| 4,507,551 | 3/1985 | Howard et al. | 250/353 |
| 4,558,222 | 12/1985 | Neil | 250/332 |
| 4,761,556 | 8/1988 | Simpson et al. | 250/352 |
| 4,783,593 | 11/1988 | Noble | 250/352 |

FOREIGN PATENT DOCUMENTS 2121211 12/1983 United Kingdom ................. 350/1.3

*Primary Examiner*—Janice A. Howell
*Assistant Examiner*—William F. Rauchholz
*Attorney, Agent, or Firm*—Clement A. Berard, Jr.; William H. Meise

[57] ABSTRACT

An infrared imager includes an array of imager elements. Infrared radiation is focussed onto the array by a lens assembly including a plurality of lens elements. The imager array and the lens are within a cold box which includes an infrared-transparent window. For low noise, a spectrum-limiting filter is also located within the cold box, between the lens assembly and the window, at or within the pupil relief distance of the lens assembly. The pupil relief distance is extended by the use of at least one aspheric surface for one of the lens elements of the lens assembly. The mounting structure of the filter is the aperture stop for the infrared imager. The field of view may be reduced, if desired, without significant effect on the noise performance by use of a telescope including a second lens assembly optically identical to the first lens assembly, operated in conjunction with a confocal large-diameter lens assembly.

12 Claims, 6 Drawing Sheets

Fig. 3

| ELEMENT NO. | RADIUS OF CURVATURE (MM) | | THICKNESS/ DIST. TO NEXT ELEMENT (MM) | APERTURE DIAMETER (MM) | MATERIAL |
|---|---|---|---|---|---|
| | FRONT | BACK | | | |
| AP STOP | — | — | 3.5000 | 5.000 | |
| 201 | 7.5087 | 7.2045 | 1.0884 0.5177 | 10 | SILICON |
| 202 | 9.2944 | ASPHERIC | 1.3268 0.4316 | 9 | SILICON |
| 203 | 32.3228 | 10.7401 | 1.4520 1.0961 | 9 | GERMANIUM |
| 204 | -36.4659 | -17.9725 | 1.0856 2.1984 | 9 | GERMANIUM |
| 205 | 58.8188 | -28.3787 | 1.5000 0.8092 | 11 | SILICON |
| 206 | 12.7088 | 9.9678 | 1.5000 2.7142 | 9.5 | SILICON |
| IMAGE PLANE | | | | 7.1235 | |

| ELEMENT NO. | RADIUS OF CURVATURE (MM) FRONT | RADIUS OF CURVATURE (MM) REAR | THICKNESS/DIST. TO NEXT SURFACE (MM) | APERTURE DIAMETER (MM) | MATERIAL |
|---|---|---|---|---|---|
| OBJECT | — | — | $-\infty$ | — | — |
| 407 | +27.1712 | +57.4110 | 1.8588<br>4.2017 | 18.5 | SILICON |
| 408 | +288.0872 | +38.8393 | 1.0000<br>1.3453 | 13 | GERMANIUM |
| APERTURE STOP | — | — | 0<br>12.3384 | 11.6887 | — |
| 409 | −39.5302 | −31.6992 | 1.2572<br>7.6407 | 17.0 | GERMANIUM |
| 410 | +17.1050 | +21.6907 | 1.6452<br>14.5246 | 17.0 | SILICON |
| IMAGE PLANE | — | — | — | 7.0270 | — |

Fig. 5

| ELEMENT NO. | RADIUS OF CURVATURE (MM) | | THICKNESS/ DIST.TO NEXT SURFACE (MM) | APERTURE DIAMETER (MM) | MATERIAL |
|---|---|---|---|---|---|
| | FRONT | REAR | | | |
| OBJECT | — | — | ∞ | — | — |
| APERTURE STOP | — | — | 0<br>0 | 50.0003 | — |
| 607 | +83.4274 | +278.6264 | 6.3097<br>4.2334 | 51 | SILICON |
| 608 | +405.4136 | +140.5637 | 4.2848<br>78.2079 | 46 | GERMANIUM |
| 609 | +19.4675 | +17.5734 | 4.5546<br>5.3812 | 13 | GERMANIUM |
| IMAGE | — | — | — | 6.7060 | — |

Fig. 7

SELECTABLE FIELD INFRARED IMAGER AND LENS SET

The Government has rights in this invention pursuant to Navy Contract No. N00014-85-C-2596.

This invention relates to infrared imagers, and more particularly to configurations of cold shields, and of lens arrangements which may be stacked or cascaded to provide a low-noise image with selectable field.

BACKGROUND OF THE INVENTION

Infrared imagers convert infrared radiation into electrical signals, much as television cameras convert a light scene into television signals which may be processed and viewed. Infrared imagers are widely used for nighttime viewing, tracking of hot objects, and verifying building insulation. They are also used in medicine for detecting thermal abnormalities, as in mammography. For many of these applications, interest is directed to a particular infrared spectrum.

Infrared imagers tend to be relatively nonselective as to the nature of the photon energy to which they respond. For example, imager elements (converters of infrared radiation into electrical signals) which are sensitive to infrared radiation are likely to also be responsive to visible light. For this reason, it may be desirable to use a spectrum-limiting filter placed to intercept the undesired portion of the radiation spectrum reaching the imager. The filters for limiting the spectrum of the radiation reaching the imager element are transparent within the selected spectrum. Outside the selected spectrum, the filters may have a high emissivity or capability of radiation, akin to that of a black-body radiator.

In order to maximize the sensitivity of the infrared imager, it is necessary to reduce the stray radiation falling on the photosensitive surface of the imager element. In particular, infrared radiation attributable to thermal effects in structures adjacent to the imager element must be controlled. This control may be achieved by reducing the emissivity of the material of which the structures are constructed, or by reducing the temperature, or both. In general, it is undesirable to use low-emissivity materials, such as polished metals, near the imager, since their low emissivity is offset by the effects of relatively great reflectivity, which causes any stray radiation which happens to be present to reflect from the low emissivity surface rather than being absorbed. Therefore, the structures surrounding the imager, and the imager element itself, are desirably maintained at a low temperature. It is common to house the imager element and the surrounding structures in a "cold box," which is maintained at a cold or low temperature. The low temperature may be provided by a Dewar vessel of liquified gas such as liquid air or liquid nitrogen. For less demanding applications at the current state of the art, one or more electrically energized Peltier thermocouples may be used to cool the cold box. Such thermocouples are electrically actuated heat pumps having a cold surface and a hot surface, and may be cascaded to decrease the temperature of the cold surface which is in contact with the cold box or with the imager and surrounding structures.

A lens assembly is used in infrared imagers to focus radiation from the object being imaged onto the photosensitive surface of the imager element. The lens assembly includes one or more lens elements, and a mounting structure therefor. The lens assembly mounting, and other portions of the lens assembly are part of the structure adjacent the imager which may contribute to the stray radiation which generates noise in the imager signal and which in turn reduces the useful sensitivity of the imager.

It is desirable to enhance the sensitivity of the imager. It is further desirable to be able to conveniently change the field of view of an infrared imager, or to conveniently select the infrared spectrum to which it responds, without disassembly of the cold box and its associated structures.

SUMMARY OF THE INVENTION

An imager arrangement for imaging infrared radiation over a predetermined infrared spectrum includes an imager element with a planar surface which responds to radiated photons over a spectrum greater than the predetermined spectrum. A first lens assembly has its focal plane near the surface of the imager element, and a first radiation acceptance angle, for focussing onto the surface of the imager element that radiation received within the first acceptance angle. The first lens assembly includes a plurality of lens elements, each including at least one spherical surface. Stray radiation arriving at the surface of the imager element from surroundings at ambient temperature contribute to a noise component of the electrical signal produced by the imager element. The noise component of the signal tends to mask the desired signal, thereby reducing the sensitivity of the imager. A cold box encloses the imager and the first lens assembly, and is maintained at a temperature below ambient in order to cool the imager and the first lens assembly and to reduce the noise component of the signal. The cold box has an infrared-transparent window through which radiation may reach the first lens assembly. An infrared spectrum limiting filter limits the infrared spectrum arriving at the first lens assembly to the predetermined infrared spectrum. The filter has high emissivity outside the predetermined infrared spectrum, and may emit substantial infrared radiation, which might tend to be coupled to the imager element to reduce its useful sensitivity. The first lens assembly further includes at least one lens element, at least one surface of which is aspherical and selected to provide, in conjunction with the other spherical lens surfaces, a relatively large pupil relief distance for the desired field of view. The infrared-transparent window is relatively remote from the first lens assembly. The infrared spectrum limiting filter is at or within the pupil relief distance, and its mounting defines the aperture stop or limiting pupil. The filter is within the cold box, between the first lens assembly and the window. The filter is kept at a low temperature, so the infrared emission is low, thereby enhancing the sensitivity of the imager. In a particular embodiment of the invention, an telescope is coupled with the imager to adjust the field of view. The telescope includes a second lens assembly optically identical to the first lens assembly, confocal with a large-diameter lens assembly. In yet another embodiment of the invention, a second infrared spectrum limiting filter is interposed between the telescope and the infrared window for further limiting the infrared spectrum to which the imager responds.

DESCRIPTION OF THE DRAWING

FIG. 3 is a table of characteristics of the lens elements of FIG. 2;

FIG. 5 is a table of characteristics of the lens elements illustrated in FIG. 4;

FIG. 7 is a table of characteristics of the lens elements illustrated in FIG. 6.

DESCRIPTION OF THE INVENTION

Figure 1A:
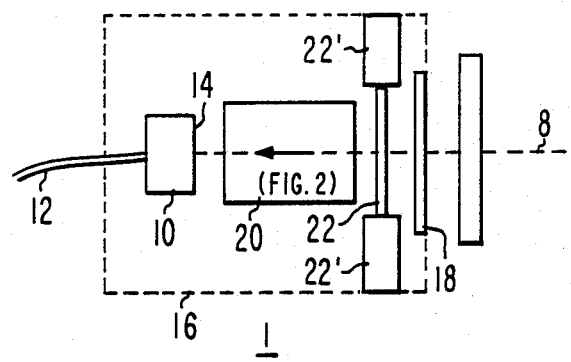
FIGS. 1a, 1b, and 1c, referred to jointly at FIG. 1, represent imagers according to the invention, each including a detector element, a first lens assembly, a cold box with a transparent window, and a spectrum-limiting filter, and in which FIGS. 1b and 1c further include telescopes.

FIG. 1a represents an imager 1 according to the invention. In FIG. 1a, an imager element array 10 such as a charge-coupled device (CCD), well known in the art, produces electrical signals on a set of wires illustrated as 12, as a result of the focussing of an infrared image onto a plane photosensitive surface 14 of imager element 10. Plane photosensitive surface 14 is centered on an optical axis 8. In this context, the term optical refers to the infrared properties of the imager which are analogous to the visual-light properties of an optical system.

As is known in the art, the inherent noise of the imager element may be reduced by reducing its temperature. In the arrangement of FIG. 1, imager element 10 is contained within a cold box or enclosure 16, which is maintained at a temperature of about 80° Kelvin by immersion in a liquified gas contained within a Dewar vessel. Wires 12, illustrated as passing through the walls of the cold box, actually emerge in a suitable known fashion. Cold box 16 includes an infrared-transparent window in the form of an open aperture centered on axis 8 defined in one end of cold box 16, closed by a flat plate 18 of infrared-transparent material, such as Germanium (Ge) or Silicon (Si). The material of which cold box 16 is constructed is an infrared-absorbing material such as anodized aluminum, which as known radiates in the radiation spectrum to which imager element 10 responds, depending upon its temperature. This radiation might impinge on photosensitive surface 14, adding a radiation component unrelated to the desired infrared radiation image, which in turn results in production of a noise signal component on output conductors 12, which tends to reduce the sensitivity of the imager. Reduction of the sensitivity in this context means that the imager output signal for low levels of the desired infrared radiation image is swamped or overcome by the noise signal, so as not to be distinguishable from the noise. The amount of infrared radiation generated by the cold box and by the structures contained therein is reduced by virtue of the low temperatures at which it is maintained during operation.

Infrared radiation from the object (not illustrated) being imaged arrives from the right as viewed in FIG. 1a and is focussed onto photosensitive surface 14 of imager element 10 by a first lens assembly 20, which is described in greater detail below in conjunction with FIGS. 2 and 3. Lens assembly 20 is contained within cold box 16, and is therefore maintained at a low temperature. Consequently, the lens assembly mounting structure, and the mounting structure within lens assembly 20 which mounts and holds the individual lens elements, is also maintained at the low temperature of the cold box, and tends to produce little radiation which as mentioned might reduce the sensitivity of the imager.

Imager element 10 responds relatively nonselectively to a broad spectral range of electromagnetic radiation, including infrared and visible light. For many purposes, the visible-light spectral components of the response, and portions of the infrared spectrum, do not convey useful information. Consequently, the portion of the imager output signal attibutable to such components is equivalent to a noise signal. An infrared-spectrum limiting filter 22 limits the infrared spectrum reaching lens assembly 20 and imager element 10 to a desired predetermined range. This enhances the useful sensitivity within the desired infrared spectrum.

If several narrow infrared spectral ranges are of interest, filter 22 passes or is transparent to an infrared spectrum encompassing the several narrow spectra. Outside the infrared spectrum to which it is transparent, filter 22 is infrared-absorptive. Consequently, it also has the characteristics of a black-body radiator outside the range to which it is transparent. In order to reduce the effect of the black-body radiation on the sensitivity of the imager, filter 22 is mounted within cold box 16, and is maintained at the low temperature of the Dewar. Consequently, the magnitude of the radiation attributable to out-of-band radiation of filter 22 is reduced.

Lens assembly 20 in conjunction with filter 22 is telecentric, in that rays defining the paths taken by radiation from the object being imaged which pass through axis 8 at the location of the aperture stop 22', travel or pass through the lens and fall orthogonally onto the photosensitive surface, notwithstanding the angle of arrival at the aperture stop. As described below, this allows stacking or cascading of the structure of FIG. 1a with telescopes which relay images in such a manner that the cold shield remains optimal notwithstanding the field of view selected. In accordance with an aspect of the invention, the aperture stop is defined by the mounting (illustrated as 22') surrounding spectrum-limiting filter 22. If window 18 were the limiting pupil, the pupil would lie in such a location that telecentricity would no longer be preserved. This might cause vignetting when the lenses are used in combination as described below.

On the other hand, if lens assembly 20 includes the limiting pupil within itself, the F number of the limiting pupil (termed cold stop when within cold box 16) must exceed that of lens 20, resulting in undesired transmission of background noise to detector 10, or the F number of the limiting pupil must be the same as that of the lens, resulting in vignetting and illumination which is non-uniform across the field.

According to another aspect of the invention, lens assembly 20 includes at least one lens element which has an aspheric surface. The combination of lens elements including a lens element with an aspheric surface permits a relatively long cold stop. A perfect cold stop is one which directly limits the F number seen by each individual element of the imager array and which allows each element of the array, no matter how far off-axis, to see the full F number without vignetting.

Figure 1B:
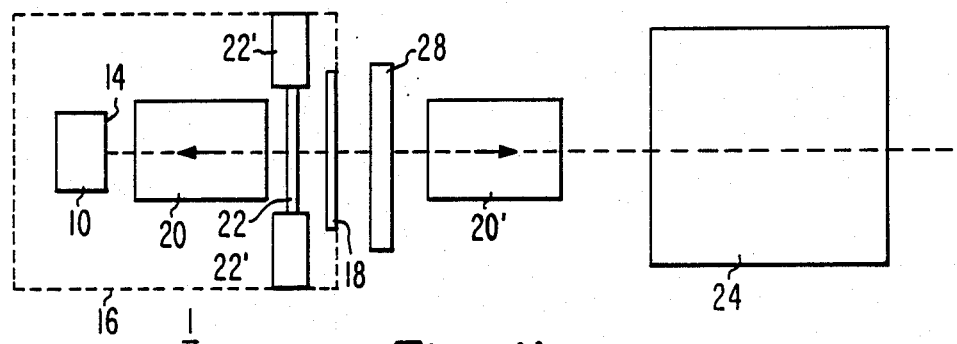
Figure 1C:
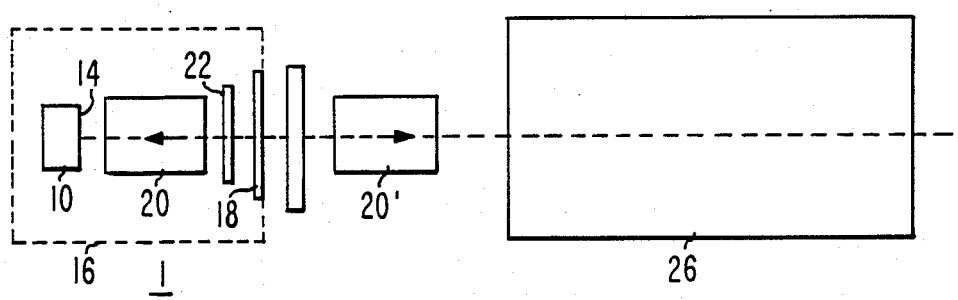

FIG. 1b illustrates the use of imager 1 of FIG. 1a in conjunction with a telescope including a further lens assembly 20' and also including a large-diameter lens assembly 24 confocal with lens assembly 20' for reducing the field of view of imager 1. FIG. 1c is similar to FIG. 1b, but illustrates a larger-diameter lens assembly 26 confocal with lens assembly 20' for a yet further decrease in the field of view.

Figure 2A:
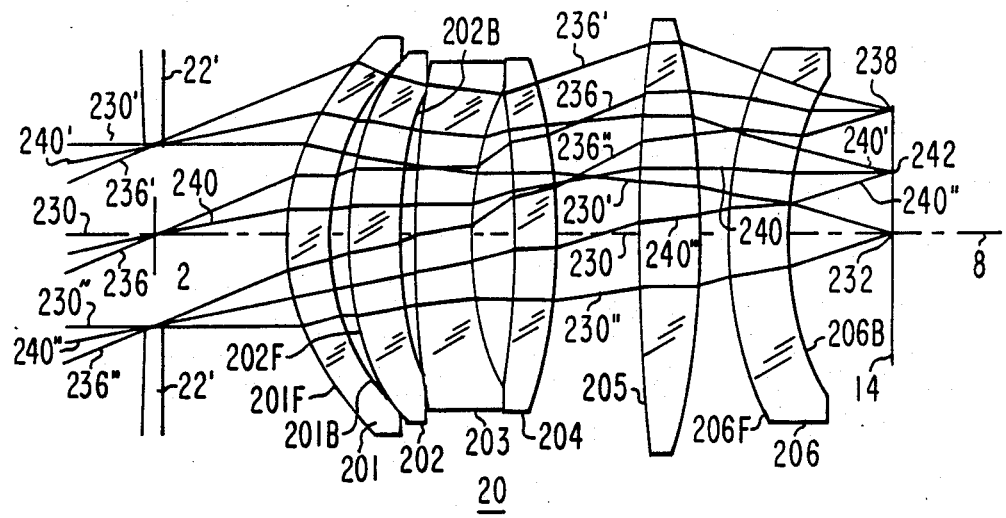
FIG. 2a is a computer-generated illustration of the arrangement of the lens elements of the first lens assembly of FIG. 1, including ray tracings.

FIG. 2a illustrates the arrangement of lens elements within lens assembly 20 of FIG. 1 and their relationships to surface 14 of imager array 10 and to the aperture stop defined by the mounting 22' of filter 22. Elements of FIG. 2a corresponding to those of FIG. 1 are designated by the same reference numbers. In FIG. 2a an objective lens 201 has its front surface 201F spaced by 3.5 mm along axis 8 from cold stop 22'. Cold stop 22' has an effective aperture diameter of 5.000 mm. These values are listed in the first row labeled "AP STOP" of FIG. 3, at columns entitled "THICKNESS, DIST TO NEXT ELEMENT" and "APERTURE DIAMETER", respectively.

Objective lens 201 of FIG. 2a is made from Silicon (Si), and has spherical front and rear surfaces 201F and 201B, respectively. The radius of curvature of front surface 201F of objective lens 201 is +7.5087 mm. A positive value of radius of curvature means, by reference to FIG. 2a, that the center of curvature is to the right of the surface. Front surface 201F is therefore convex. Conversely, a negative value of the radius of curvature would mean that the center of curvature is to the left of the surface as seen in FIG. 2a, in which case front surface 201F would be concave. The rear or back surface 201B of lens 201 has a radius of curvature of +7.2045 mm. The values of radius of curvature of the front and rear surfaces of lens 201 are listed in the table of FIG. 3 at the row designated 201, and under the column headed "RADIUS OF CURVATURE" and "FRONT" or "BACK", respectively. The last column of the table of FIG. 3 lists the material of which the lens element is made; in the case of lens element 201 the materials is silicon.

The thickness of lens element 201 as measured at axis 8 (the "axial thickness") is 1.0884 mm, as listed in the table of FIG. 3 in the upper half of the box in the columm headed "THICKNESS, DIST. TO NEXT ELEMENT". The axial distance from the rear surface of lens 201 to the front surface of the next lens element, which is lens element 202, is listed in FIG. 3 as the lower number in the column headed "THICKNESS/DIST. TO NEXT ELEMENT". The axial distance between rear surface 201B of lens element 201 and the front surface 202F of lens element 202 is tabulated in FIG. 3 as 0.5177 mm.

The effective aperture diameters of front surface 201F and rear surface 201B of lens element 201 are approximately equal and are listed as 10 mm, in the column of FIG. 3 headed "APERTURE DIAMETER". The values of aperture diameter take into consideration the portion of each lens element which is stopped by the lens element mounting (not illustrated).

In the same manner, the radius of curvature of the spherical front and rear surfaces of each of lens elements 202-206 of the lens assembly of FIG. 2a (except for the rear surface 202B of lens element 202) may be determined by reference to the first two data columns of the table of FIG. 3, and the axial thickness of the lens element may be determined by reference to the upper number in the third data column. The axial distance from the rear surface (designated B) of each lens element to the front surface (designated A) of the next following lens element (in order beginning with the objective lens element 201) may be determined by reference to the lower number in the third data column. The effective aperture diameters of each lens element may be determined from the fourth data columns, and the material from which the lens is made from the fifth column.

The front surface 206F of lens element 206 is spaced from the rear surface 205B of lens element 205 by 0.8092 mm, as tabulated in FIG. 3 in row 205. From row 206, front surface 206F is spherical with a radius of curvature of +12.7088 mm, and rear surface 206B of lens element 206 has a spherical radius of curvature of +9.9678 mm, with an axial thickness of lens element 206 of 1.5000 mm. The diameter of lens element 206 is 10.0 mm. Lens element 206 is made from silicon. Its rear surface is spaced by 2.7142 mm from imager surface or plane 14. The effective aperture at image plane 14 is 7.1235 mm. The characteristics and spacing of the front and rear surfaces of lens elements 203, 204 and 205, and of the front surface of lens element 202, are obvious from the table of FIG. 3 and the preceding discussion.

Figure 2B:
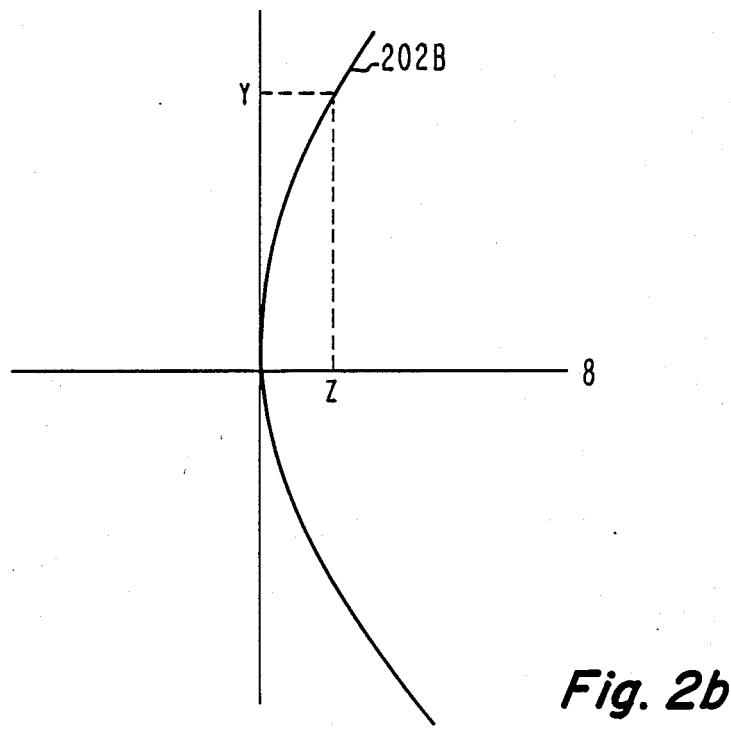
FIG. 2b is a representation of an aspheric lens surface of a lens element of the arrangement of FIG. 2.

As mentioned, the rear or back surface 202B of lens element 202 is aspherical, in order to provide the long pupil relief of 3.5000 mm. Aspheric surface 202B is illustrated in cross-section in FIG. 2B, with a superposed rectangular coordinate system in which the Z axis corresponds to central axis 8, and in which the Y axis is radial. Aspheric surface 202B is cylindrical or symmetrical about axis 8. The function defining the shape of aspheric surface 202B in the plane illustrated in FIG. 2B is given by $$Z = \frac{(CURV)Y^2}{1 + (1 - (1 + K)(CURV)^2 Y^2)^{\frac{1}{2}}} + AY^4 + BY^6 + CY^8 + DY^{10}$$

where
CURV is the reciprocal of a particular spherical radius of curvature $1/R'$, and K, A, B, C and D are constants. For the particular embodiment of the invention tabulated in FIG. 3, $$R' = 14.06939 \text{ mm, and } CURV = \frac{0.07107624}{\text{mm}}$$

K = +1.195753
A = +1.63450 E−04
B = −2.13237 E−06
C = −2.92919 E−08
D = +2.76051 E−09, and
the notation E−XY, where XY is a two-digit number, represents $10^{-XY}$.

The lens assembly 20 for the values tabulated in FIG. 3 and with the above aspherical rear surface of lens 202 has a reference wavelength of 4300.0 nanometers (nm) and a spectral region of 3800 to 4800 nm. The effective focal length is 7.9998 mm, the back focal length (BFL), which is the clearance between the last element and the image, is 2.7205 mm, the F number is 1.6000, the image distance is 2.7142 mm, the overall physical length is 16.5058 mm, the paraxial image height is 3.5618 mm, and the semi-field angle is 24.0000 degrees. The full field of view is therefore 48°.

As mentioned, lens assembly 20 is telecentric, in that rays crossing the axis at the limiting pupil fall orthogonally onto image plane 14. In FIG. 2a, three sets of parallel rays are traced. A first set of rays 230, 230' and 230" enters lens assembly 20 parallel with axis 8, and comes to a focus at a point 232 on image plane 14, at axis 8. A second set of rays 236, 236' and 236" enters the limiting aperture defined by filter mounting 22', and the rays cross axis 8 (and lines parallel with axis 8) at an angle of 24° (the maximum angle for the lens element tabulated in in FIG. 3), and come to a focus at a point 238. Similarly, parallel ray set 240, 240' and 240" enters at an angle between 0° and 24°, and comes to a focus at intermediate point 242.

In order to reduce the ±24° field of view, the imager 1 of FIG. 1a, using the lens assembly 20 as detailed in FIG. 2a and tabulated in FIG. 3, is combined with a second lens assembly 20' similar to lens assembly 20, and with a further lens assembly 24 as illustrated in FIG. 1b. Lens assembly 20' of FIG. 1b is reversed in orientation or direction relative to lens assembly 20, so that lenses 201 of lens assemblies 20 and 20' are nearest each other. This reversal of orientation is illustrated in FIG. 1b by a reversal of the direction of reference arrows within representative boxes 20 and 20'. Lens 20' is outside cold box 16.

In the arrangement of FIG. 1b, the front surfaces 201F of lens elements 201 (not illustrated in FIG. 1b) of lens assemblies 20 and 20' are spaced apart by 7.0 mm, thereby providing additional space between lens assembly 20' and window 18 for a further spectrum limiting filter 28, if desired. Surface 206B of lens element 206 (not illustrated in FIG. 1b) of lens assembly 20' faces lens assembly 24, and is confocal therewith, i.e. the focal plane of lens assembly 20' (corresponding to focal plane 14 of FIG. 2a for the case of lens assembly 20) corresponds to the focal plane of lens assembly 24. Lens assemblies 24 and 20' together form a telescope for reducing the field of view of imager 1.

Figure 4:
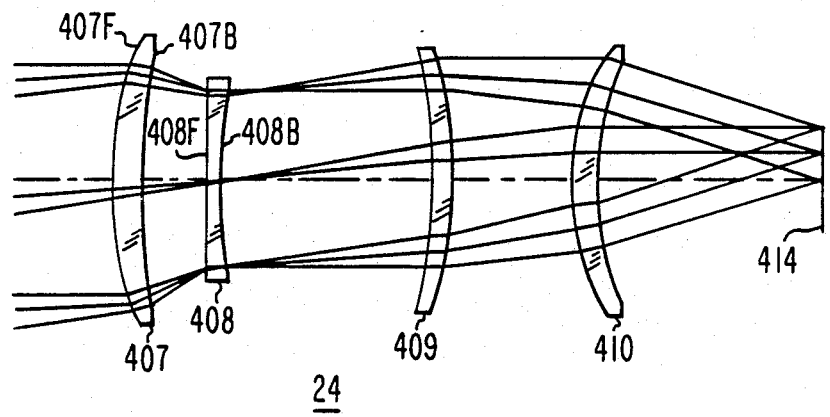
FIG. 4 is a computer-generated illustration of the arrangement of the lens elements of a portion of the telescope of FIG. 1b.

Lens assembly 24 includes an objective lens element 407 including a front surface 407F and a back surface 407B, as illustrated in FIG. 4. Lens assembly 24 includes further lens elements 408, 409 and 410. Lens element 410 is nearest lens element 206 of lens assembly 20' when imager 1, and lens assemblies 20' and 24 are assembled as illustrated in FIG. 1b. FIG. 5 tabulates the characteristics of lens elements 407–410 of lens assembly 24.

As listed in the row designated 407 in table of FIG. 5, the object to be imaged is at an infinite distance (∞) from the front surface of lens element 407. The front surface 407F of lens element 407 has a spherical radius of curvature of +27.1712 (positive meaning that the center of curvature is to the right of the lens element surface in the illustration of FIG. 4), and rear surface 407B has a radius of curvature of +57.4110. The axial thickness of lens element 407 is 1.8588 mm, and its rear surface 407B is spaced by 4.2017 mm from the next surface, which is the front surface 408F of lens element 408. Lens element 407 has a diameter of 18.5 mm and it is formed from silicon.

The front and rear surfaces 408F and 408B, respectively, of lens element 408 of lens assembly 24 have radii of curvature of +288.0872 and +38.8393 mm, respectively, as tabulated in the row designated 408 in FIG. 5. The axial thickness of lens element 408 is 1.0000 mm, and its rear surface 408B is spaced by 1.3453 mm from an aperture stop (not illustrated in FIG. 4). The diameter of lens element 408 is 13 mm, and it is made from germanium (Ge).

The aperture stop of lens assembly 24 has a diameter of 11.6887 mm, as listed in FIG. 5, and it is spaced by 12.3384 mm from the front surface of lens element 409. The characteristics of lens elements 409 and 410 may be easily taken from FIG. 5 based upon the preceding discussion. The image plane (414 of FIG. 4) is spaced by 14.5246 mm from the rear surface of lens element 410 as tabulated in the row designated 410 in FIG. 5, and the image diameter is 7.0270 mm, as tabulated in the IMAGE PLANE row. When the lens assembly 24 is joined with lens assembly 20' as illustrated in FIG. 1b, focal plane 414 of lens assembly 24 is congruent with a focal plane of lens assembly 20' which corresponds to focal plane 14 of FIG. 2a.

Lens assembly 24 of FIG. 4 has an effective focal length of 24.9999 mm, F number of 1.6000 mm, overall physical length of 31.2873 mm, paraxial image height of 3.5135 mm and semi-field angle of 8.000°, corresponds to a field of view of 16°. The reduced field of view by comparison with the arrangement 1 of FIGS. 1a, 2 and 3 is achieved without significant effect on the noise of the signal produced by the imager. Furthermore, the change in field of view is achieved simply by adding structure (lens assemblies 20' and 24) to the structure of imager 1 of FIG. 1a.

Figure 6:
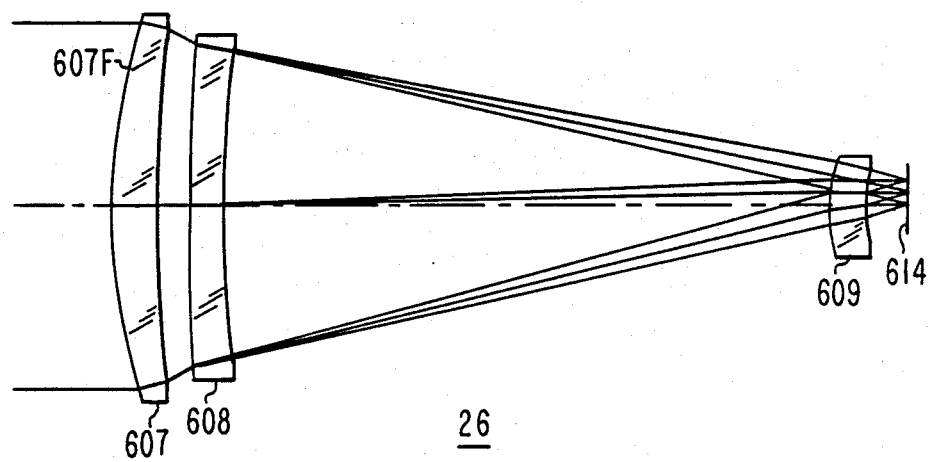
FIG. 6 is a computer-generated illustration of the arrangement of the lens elements of a portion of the telescope of FIG. 1c.

In order to reduce the ±24° field of view of imager 1 of FIG. 1a to less then ±8°; imager 1 may be combined with a telescope including second lens assembly 20' as previously described, coupled confocally with a lens assembly illustrated as 26 in FIG. 1c. In the arrangement of FIG. 1c, lens 20' is positioned relative to imager 1 as in FIG. 1b. The only essential difference between FIGS. 1b and 1c lies in the use of lens assembly 26 as opposed to lens assembly 24. Details of lens assembly 26 are illustrated in FIG. 6. Lens assembly 26 includes an objective lens element 607 with a front surface 607F, and also includes lens elements 608 and 609. Lens element 609 is nearest to a lens element of lens assembly 20' corresponding to lens element 206 of lens assembly 20 when assembled as illustrated in FIG. 1c, and focal plane 614 of lens assembly 26 (FIG. 6) is congruent with a focal plane of lens assembly 20' corresponding to focal plane 14 of lens assembly 20 (FIG. 2a).

FIG. 7 tabulates the physical characteristics of the lens elements of lens assembly 26. The meaning of the values listed in FIG. 7 is obvious in view of the preceding discussion of FIGS. 3 and 5. The reference wavelength and spectral region of lens assembly 26 of FIGS. 6 and 7 are 4300.0 nm, and 3800.0–4800.0 nm, respectively. The effective focal length of lens assembly 26 is 80.0005 mm, the BFL is 5.3933 mm, the F number is 1.6000, the overall length is 97.5904 mm, the paraxial image height is 3.3530 mm, and the semi-field angle is 2.4000° for a total field view of 4.8°. The reduction of the field of view of imager 1 of FIG. 1a by adding the afocal telescope consisting of lens assemblies 20' and 26, as illustrated in FIG. 1c, is accomplished without significant effect on the residual noise.

What is claimed is:
1. An imager arrangement for imaging infrared radiation over a predetermined infrared spectrum comprising:
an array of imager elements including a planar surface, said array of imager elements being responsive to infrared radiation over an infrared spectrum greater that said predetermined infrared spectrum and having a radiation acceptance angle of about

180° for producing signal including a component representing an image;

a first lens assembly, said first lens assembly including a focal plane near said planar surface, an objective first lens element and a first acceptance angle for focussing infrared radiation arriving at said objective first lens element of said first lens assembly, and within said acceptance angle, onto said planar surface of said array of imager elements, said first lens assembly including a plurality of lens elements with spherical surfaces, whereby stray infrared radiation arriving at said planar surface of said array of imager elements from surroundings at ambient temperature result in a noise signal component which results in a noisy image;

a cold box enclosing said array of imager elements and said first lens assembly, said cold box being maintained, during operation, at a temperature sufficiently lower than said ambient temperature to reduce said stray infrared radiation sufficiently to reduce said noise signal component to an acceptable level, said cold box further comprising an infrared-transparent window;

a spectrum limiting first filter for limiting the infrared spectrum of the infrared radiation arriving at said first lens assembly to a predetermined infrared spectrum, said first filter having a high emissivity immediately outside said predetermined infrared spectrum, which results in relatively high emission immediately outside said predetermined infrared spectrum when at said ambient temperature, which results in a noise signal component of said signal produced by said array of imager elements which tends to reduce the sensitivity thereof;

said first lens assembly further comprising at least one lens element including an aspheric surface for providing a predetermined pupil relief distance from said objective first lens element, said first filter being located at said predetermined pupil relief distance of said objective first lens element of said first lens assembly, between said infrared transparent window and said objective first lens element, thereby defining an aperture stop for said first lens assembly and said imager, whereby said first filter is maintained at said cold temperature, thereby reducing said relatively high emission in said infrared spectrum immediately outside said predetermined infrared spectrum, which reduces said noise signal component of said signal produced by said array of imager elements, thereby tending to restore said sensitivity.

2. An arrangement according to claim 1 further comprising a spectrum-limiting second filter adapted for further limiting, to a portion of said predetermined optical spectrum, the infrared spectrum transmitted to said first lens assembly and to said first filter.

3. An arrangement according to claim 2 wherein said second filter is on the ambient-temperature side of said infrared-transparent window.

4. An arrangement according to claim 2, further comprising a second lens assembly optically identical with said first lens assembly, said second lens assembly being mounted with said first lens element of said first lens assembly adjacent the first lens element of said second lens assembly, and with said second filter at the pupil relief distance from said first lens element of said second lens assembly.

5. An arrangement according to claim 1, further comprising:
a second lens assembly optically identical with said first lens assembly, said second lens assembly being mounted with said first lens element of said first lens assembly adjacent the first lens element of said second lens assembly.

6. A arrangement according to claim 1, further comprising a telescope for selecting the field of view, said telescope comprising:
a second lens assembly optically identical with said first lens assembly, and including a first lens element and a focal plane;
a third lens assembly including an objective lens element larger than said first lens element of said second lens assembly, and having a common focal plane with said second lens assembly, said telescope being mounted with said objective lens element of said third lens assembly remote from said infrared-transparent window.

7. An arrangement according to claim 1, wherein said first lens assembly, for the spectrum ranging from 3800 to 4800 nanometers, comprises, in order from the object to the image, and coaxially disposed:
a silicon first lens element having a convex front surface with a spherical radius of curvature of about 7.5 mm, an axial thickness of about 1.1 mm, and a concave rear surface with a spherical radius of curvature of about 7.2 mm;
said rear surface of said first lens element being axially spaced by about 0.5 mm from the front surface of a silicon second lens element, said second lens element having a convex front surface with a spherical radius of curvature of about 9.3 mm, an axial thickness of about 1.33 mm, and a concave rear surface, said rear surface being said aspheric surface;
said aspheric surface of said second lens element being spaced by about 0.43 mm from the front surface of a germanium third lens element, said third lens element having a convex front surface with a spherical radius of curvature of about 32.3 mm, an axial thickness of about 1.45 mm and a concave rear surface with a spherical radius of curvature of about 10.7 mm;
said rear surface of said third lens element being axially spaced by about 1.1 mm from the front surface of a germanium fourth lens element, said fourth lens element having a concave front surface with a spherical radius of curvature of about 36.5 mm, an axial thickness of about 1.1 mm, and a convex rear surface with a spherical radius of curvature of about 18 mm;
said rear surface of said fourth lens element being axially spaced by about 2.2 mm from the front surface of a silicon fifth lens element, said fifth lens element having a convex front surface with a radius of curvature of about 59 mm, and axial thickness of about 1.5 mm, and a convex rear surface with a spherical radius of curvature of about 28.4 mm;
said rear surface of said fifth lens element being spaced axially by about 0.8 mm from the front surface of a silicon sixth lens element, said front surface of said sixth lens element being convex with a spherical radius of curvature of about 12.7 mm, an axial thickness of about 1.5 mm between said front surface and a concave rear surface, said rear surface of said sixth lens element having a spherical radius of curvature of about 10 mm, whereby when said aspheric surface has a basic spherical curvature of about 0.07/mm, the axial distance between said rear surface of said sixth lens element and said focal plane is about 2.7 mm.

8. An arrangement according to claim 7 wherein said aspheric rear surface of said second lens element is circularly symmetric about said axis, and the position Z of a point on a cross-section of said rear surface in a direction parallel with said axis, relative to the intersection of said aspheric rear surface with said axis, as a function of radius Y measured perpendicularly from said axis, is defined by the equation:

$$Z = \frac{(CURV)Y^2}{1 + (1 - (1 + K)(CURV)^2Y^2)^{\frac{1}{2}}} + AY^4 + BY^6 + CY^8 + DY^{10}$$

where CURV is 1/spherical radius of curvature, and K, A, B, C, D are constants.

9. An arrangement according to claim 8 wherein:
CURV is about 0.07/mm;
K is about 1.2;
A is about 1.6 E−04;
B is about −2.13 E−06;
C is about −2.9 E−08; and
D is about 2.7 E−09, whereby
said pupil relief distance for a field of view of ±24° is about 3.5 mm.

10. An arrangement according to claim 9 wherein:
the aperture diameter of first lens element is about 10 mm;
the aperture diameter of second lens element is about 9 mm;
the aperture diameter of said third lens element is about 9 mm;
the aperture diameter of said fourth lens element is about 9 mm;
the aperture diameter of said fifth lens element is about 11 mm;
the aperture diameter of said sixth lens element is about 9.5 mm; and
said aperture stop has a diameter of about 5.0 mm at a distance from said front surface of said first lens element of about 3.5 mm.

11. An arrangement according to claim 1, further comprising a telescope for selecting the field of view, wherein said first lens assembly, for the spectrum ranging from 3800 to 4800 nm, comprises, in order from the object to the image, and coaxially disposed:
a silicon first lens element having a convex front surface with a spherical radius of curvature of about 7.5 mm, an axial thickness of about 1.09 mm, and a concave rear surface with a spherical radius of curvature of about 7.2 mm;
said rear surface of said first lens element being axially spaced by about 0.52 mm from the front surface of a silicon second lens element, said second lens element having a convex front surface with a spherical radius of curvature of about 9.3 mm, an axial thickness of about 1.33 mm, and a concave rear surface, said rear surface being said aspheric surface;
said aspheric surface of said second lens element being spaced by about 0.43 mm from the front surface of a germanium third lens element, said third lens element having a convex front surface with a spherical radius of curvature of about 32.3 mm, an axial thickness of about 1.45 mm, and a concave rear surface with a spherical radius of curvature of about 10.7 mm;
said rear surface of said third lens element being axially spaced by about 1.1 mm from the front surface of a germanium fourth lens element, said fourth lens element having a concave front surface with a spherical radius of curvature of about 36.5 mm, an axial thickness of about 1.1 mm, and a convex rear surface with a spherical radius of curvature of about 18 mm;
said rear surface of said fourth lens element being axially spaced by about 2.2 mm from the front surface of a silicon fifth lens element, said fifth lens element having a convex front surface with a radius of curvature of about 59 mm, an axial thickness of about 1.5 mm, and a convex rear surface with a spherical radius of curvature of about 28.4 mm;
said rear surface of said fifth lens element being spaced axially by about 0.8 mm from the front surface of a silicon sixth lens element, said front surface of said sixth lens element being convex, with a spherical radius of curvature of about 12.7 mm, an axial thickness of about 1.5 mm between said front surface and a concave rear surface, said rear surface of said sixth lens element having a spherical radius of curvature of about 10 mm, whereby when said aspheric surface has a basic spherical curvature of about 0.07/mm, the axial distance between said rear surface of said sixth lens element and said focal plane is about 2.7 mm, and further in which:
said aspheric rear surface of said second lens element is circularly symmetric about said axis, and the position Z of a point on a cross-section of said rear surface in a direction parallel with said axis, relative to the intersection of said aspheric rear surface with said axis, as a function of radius Y measured perpendicularly from said axis is defined by the equation:

$$Z = \frac{(CURV)Y^2}{1 + (1 - (1 + K)(CURV)^2Y^2)^{\frac{1}{2}}} + AY^4 + BY^6 + CY^8 + DY^{10}$$

where
CURV is 1/spherical radius of curvature, and K, A, B, C, D and constants, and
CURV is about 0.07/mm;
K is about 1.2;
A is about 1.6 E−04;
B is about −2.13 E−06;
C is about −2.9 E−08; and
D is about 2.7 E−09; whereby
said pupil relief distance for a field of view of ±24° is about 3.5 mm, and wherein:
the aperture diameter of said first lens element is about 10 mm;
the aperture diameter of said second lens element is about 9 mm;
the aperture diameter of said third lens element is about 9 mm;
the aperture diameter of said fourth lens element is about 9 mm;
the aperture diameter of said fifth lens element is about 11 mm;

the aperture diameter of said sixth lens element is about 9.5; and said aperture stop has a diameter of about 5.0 mm at a distance from said front surface of said first lens element of about 3.5 mm; and wherein said telescope further comprises a second lens assembly including, in order from the object to said first lens assembly, in a coaxial relationship:

a silicon seventh lens element including a convex front surface with a spherical radius of curvature of about 27.2 mm, an axial thickness of about 1.86 mm, and a concave rear surface with a spherical radius of curvature of about 57.4 mm, said seventh lens element having a diameter of about 18.5 mm;

said rear surface of said seventh lens element being spaced by about 4.2 mm from the front surface of a germanium eighth lens element, said front surface of said eighth lens element being convex with a spherical radius of curvature of about 288 mm and a diameter of about 13 mm, said eighth lens element having an axial thickness of about 1.0 mm, said eighth lens element including a concave rear surface with a spherical radius of curvature of about 38.8 mm;

a germanium ninth lens element including a front surface axially spaced by about 13.6 mm from said rear surface of said eighth lens element, said front surface of said ninth lens element being concave with a spherical radius of curvature of about 39.5 mm and a diameter of about 17 mm, said ninth lens element having a thickness of about 1.26 mm and a convex rear surface, said rear surface of said ninth lens element having a spherical radius of curvature of about 31.7 mm;

a silicon tenth lens element including a front surface axially spaced by about 7.6 mm from said rear surface of said ninth lens element, said front surface of said tenth lens element being convex with a spherical radius of curvature of about 17.1 mm and a diameter of about 17 mm, said tenth lens element having an axial thickness of about 1.6 mm and a concave rear surface with a spherical radius of curvature of about 21.7 mm;

said telescope further including a third lens assembly identical with said first lens assembly, said rear surface of said tenth lens element of said second lens assembly being spaced by about 14.5 mm from the rear surface of the sixth lens element of said third lens assembly, whereby the field of view is $\pm 8°$.

12. An arrangement according to claim 1, further comprising a telescope for selecting the field of view, wherein said first lens assembly, for the spectrum about 4300 nm, comprises, in order from the object to the image and coaxially disposed:

a silicon first lens element having a convex front surface with a spherical radius of curvature of about 7.5 mm, an axial thickness of about 1.09 mm, and a concave rear surface with a spherical radius of curvature of about 7.2 mm;

said rear surface of said first lens element being axially spaced by about 0.52 mm from the front surface of a silicon second lens element, said second lens element having a convex front-surface with a spherical radius of curvature of about 9.3 mm, an axial thickness of about 1.33 mm, and a concave rear surface, said rear surface being said aspheric surface;

said aspheric surface of said second lens element being spaced by about 0.43 mm from the front surface of a germanium third lens element, said third lens element having a convex front surface with a spherical radius of curvature of about 32.3 mm, an axial thickness of about 1.45 mm, and a concave rear surface with a spherical radius of curvature of about 10.7 mm;

said rear surface of said third lens element being axially spaced by about 1.1 mm from the front surface of a germanium fourth lens element, said fourth lens element having a concave front surface with a spherical radius of curvature of about 36.5 mm, an axial thickness of about 1.1 mm, and a convex rear surface with a spherical radius of curvature of about 18 mm;

said rear surface of said fourth lens element being axially spaced by about 2.2 mm from the front surface of a silicon fifth lens element, said fifth lens element having a convex front surface with a radius of curvature of about 59 mm, an axial thickness of about 1.5 mm, and a convex rear surface, with a spherical radius of curvature of about 28.4 mm;

said rear surface of said fifth lens element being spaced axially by about 0.8 mm from the front surface of a silicon sixth lens element, said front surface of said sixth lens element being convex, with a spherical radius of curvature of about 12.7 mm, an axial thickness of about 1.5 mm between said front surface and a concave rear surface, said rear surface of said sixth lens element having a spherical radius of curvature of about 10 mm, whereby when said aspheric surface has a basic spherical curvature of about 0.07/mm, the axial distance between said rear surface of said sixth lens element and said focal plane is about 2.7 mm, and further in which:

said aspheric rear surface of said second lens element is circularly symmetric about said axis, and the position Z of a point on a cross-section of said rear surface in a direction parallel with said axis, relative to the intersection of said aspheric rear surface with said axis, as a function of radius Y measured perpendicularly from said axis is defined by the equation:

$$Z = \frac{(CURV)Y^2}{1 + (1 - (1 + K)(CURV)^2 Y^2)^{\frac{1}{2}}} + AY^4 + BY^6 + CY^8 + DY^{10}$$

where

CURV is 1/spherical radius of curvature, and K, A, B, C, D are constants, and

CURV is about 0.07/mm;

K is about 1.2;

A is about $1.6\, E-04$;

B is about $-2.13\, E-06$;

C is about $-2.9\, E-08$; and

D is about $2.7\, E-09$ whereby said pupil relief distance for a field of view of $\pm 24°$ is about 3.5 mm, and wherein:

the diameter of said first lens element is about 10 mm;

the aperture diameter of said second lens element is about 9 mm;

the aperture diameter of said third lens element is about 9 mm;

the aperture diameter of said fourth lens element is about 9 mm;

the aperture diameter of said fifth lens element is about 11;

the aperture diameter of said sixth lens element is about 9.5 mm; and said aperture stop has a diameter of about 5.0 mm at a distance from said front surface of said first lens element of about 3.5 mm; and wherein said telescope comprises a second lens assembly including, in order from the object to said first lens assembly, in a coaxial relationship;

a silicon seventh lens element including a front surface, said front surface being convex with a spherical radius of curvature of about 83.4 mm and a diameter of about 51 mm said seventh lens element having an axial thickness of about 6.3 mm and a concave rear surface with a spherical radius of curvature of about 278.6 mm;

a germanium eighth lens element including a front surface axially spaced by about 4.2 mm from said rear surface of said seventh lens element, said front surface of said eighth lens element being convex with a spherical radius of curvature of about 405 mm and a diameter of about 46 mm, said eighth lens element having an axial thickness of about 4.3 mm and a concave rear surface with a spherical radius of curvature of about 140 mm;

a germanium ninth lens element including a front surface axially spaced by about 78 mm from said rear surface of said eighth lens element, said front surface of said ninth lens element being convex, with a spherical radius of curvature of about 19.5 mm and a diameter of about 13 mm, said ninth lens element having an axial thickness of about 4.5 mm and a concave rear surface with a spherical radius of curvature of about 17.6 mm;

said telescope further including a third lens assembly indentical with said first lens assembly, the first lens element of said third lens assembly being spaced about 3.5 mm from said aperture stop, said rear surface of said ninth lens element being spaced by about 5.3 mm from said rear surface of the sixth lens element of said third lens assembly, whereby the field of view is ±2.4°.

* * * * *